Patented July 26, 1949

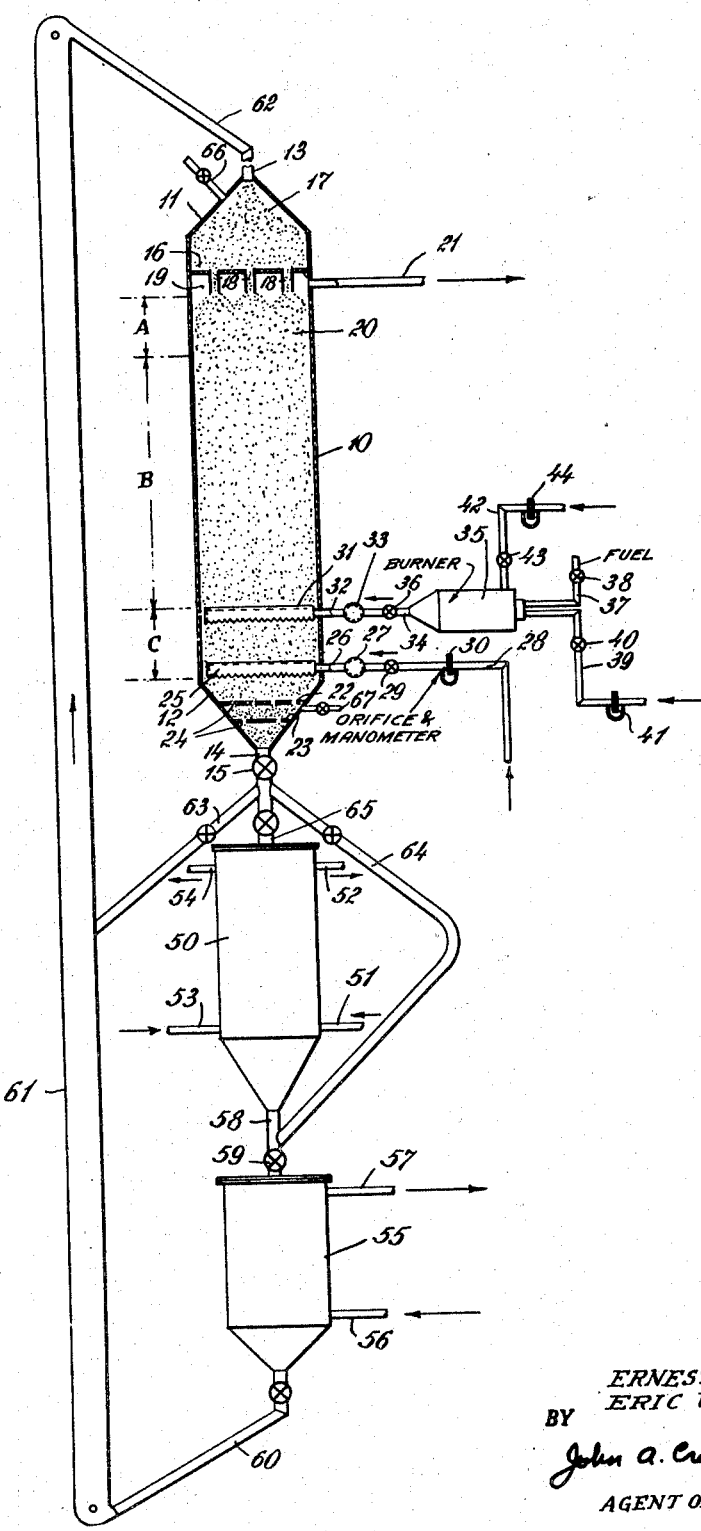

2,477,502

UNITED STATES PATENT OFFICE 2,477,502

METHOD FOR CONDUCTING GASEOUS REACTIONS IN THE PRESENCE OF A MOVING PARTICLE FORM SOLID

Ernest Utterback, New York, N. Y., and Eric V. Bergstrom, Short Hills, N. J., assignors to Socony-Vacuum Oil Company, Incorporated, a corporation of New York Application December 14, 1946, Serial No. 716,414

10 Claims. (Cl. 260—329)

This application is a continuation-in-part of application Serial Number 561,478, filed in the United States on November 1, 1944.

This invention has to do with a method for conducting gaseous reactions in the presence of a particle-form contact material moving through the reaction zone as a substantially compact column. The method of this invention is particularly adapted for conducting gaseous reactions which require reaction temperatures above those temperatures at which solid material can be practically conveyed in conventional conveyor equipment, and for conducting reactions wherein the reaction product is highly unstable under the temperature conditions involved and must be quickly cooled to prevent decomposition or polymerization thereof. Exemplary of such processes is the high temperature catalytic cracking conversion of hydrocarbons to high yields of aviation gasoline and $C_4$ fractions. Another process is the conversion of propane to acetylene at temperatures of the order of 2300° F. in the presence of an inert solid material. Another process is the dehydrogenation of butene to diolefins at temperatures of the order of 1000° F. to 1300° F. in the presence of a dehydrogenation catalyst such as chromic oxide on alumina. Still another reaction is the pyrolysis of pentene-2 to butadiene at temperatures of the order of 1200-1300° F. Another reaction is the preparation of thiophene and butadiene by reaction between n-butane and/or butene and sulfur vapors at temperatures of the order of 850–1400° F. Another process is the manufacture of ethylene by the cracking of heavier hydrocarbons such as gas oils or by the cracking of propane or ethane at temperatures of the order of 1450° F.–1800° F. Several practical difficulties arise in attempting to conduct such processes as enumerated hereinabove. In the first place, since the required reaction temperatures are generally higher than these temperature levels at which particle-form solids may be practically conveyed in existing conveying equipment, those processes requiring a catalytic material are generally conducted in the presence of a fixed bed of such catalytic material. Moreover, a major problem arises in cooling the reaction products quickly enough to prevent substantial decomposition thereof. In such process as the cracking of gas oils to ethylene, the reaction products undergo such rapid decomposition and polymerization, etc. at the reaction temperature as to cause not only serious loss of the desired product but also serious coking difficulties in the reactor outlet section and in the conduit leading the reactants from the reactor to a cooler.

A major object of this invention is the provision of a method for conducting such processes as described hereinabove which method overcomes the above described difficulties.

Another object of this invention is the provision of a practical method for conducting reactions involving gaseous reactants in the presence of a mass of moving solid material particles at reaction temperatures above those at which it has been heretofore found practical to convey solid particles.

Another object of this invention is the provision in a process wherein the reactant product requires quick cooling to prevent excessive decomposition thereof, of a novel method for quenching the reactant products.

Another object is the provision in a process for conducting gaseous reactions in the presence of a column of moving contact material particles of an improved method for controlling the contact material temperature within the reaction zone.

Another object is the provision of a practical continuous process for conducting high temperature gaseous reactions in the presence of a substantially compact column of moving solid particles.

These and other objects of this invention will become apparent from the following description of the invention.

In a simple form the method of this invention comprises passing a suitable particle-form solid material downwardly through a suitable vessel as a substantially compact column, the solid material entering and leaving said vessel at temperature levels substantially below the desired reaction temperature; a reactant gas, at a temperature substantially below its reaction temperature is introduced into the column near its lower end and is passed upwardly through said column so as to cool the solid material in the lower section thereof. The gaseous reaction products serve to heat the solid material passing through the upper section of the column to the desired reaction temperature. At the same time the entering reactant gas is heated by the solid in the lower section of the column to the desired reaction temperature and the gaseous reactant products are quickly quenched by direct contact with the solid material in the upper section of the column to a temperature sufficiently low to prevent undue decomposition of said reactant products. The heat makeup required to compensate for heat loss and the heat of reaction is supplied by introduction into the column of a suitable, hot heat exchange gas at a level somewhat above the level of cool reactant inlet. This heat exchange gas passes through the intermediate reaction zone along with reactant gas introduced therebelow.

It should be understood that the terms "gas" and "gaseous material" as used herein in describing and in claiming this invention are used in a broad sense as meaning material in the gaseous phase under the particular conditions of pressure and temperature involved regardless of the normal phase of that material under ordinary atmospheric conditions.

The invention may be more readily understood by reference to the attached drawing which is an elevational view, partially in section, showing a preferred arrangement according to this invention. The drawing is highly diagrammatic in form.

In the drawing, 10 represents the shell of a substantially vertical vessel closed on its upper end by converging section 11 and on its lower end by converging section 12. The vessel may be of circular, rectangular or other cross-sectional contour. A conduit 13 is connected into the upper end of the vessel for admittance of particle-form solid material and a conduit 14 having flow throttle valve 15 thereon is provided at the bottom of the vessel for solid material discharge. A partition 16 is supported across the vessel near its upper end so as to provide a feed chamber 17 within the upper end of the vessel. Uniformly distributed pipes 18 depend from the partition 16 and terminate a fixed distance therebelow so as to provide a gas disengaging space 19 within the upper section of the vessel and confined passages for solid material flow therethrough to the surface 20 of the column of solid material maintained within the vessel. A gas outlet conduit 21 is connected to the vessel near the upper end of the gas disengaging space 19. It will be apparent that means, other than that shown may be provided for introduction of solid material to the surface 20 of the column within the vessel and for disengagement and withdrawal of effluent gas. Partitions 22 and 23 spaced vertically apart are supported across the converging drain section 12 of the vessel. Orifices 24 through the partitions are suitably distributed so as to cause the division of the solid material flow into a plurality of streams proportionately distributed with respect to the vessel cross-section, which streams are then gradually and proportionately recombined into a single stream discharging through the conduit 14. The partition and orifice arrangement thus serves to provide uniform withdrawal of solid material from the entire cross-section of the column thereof within the vessel. Any other construction properly designed to serve the same purpose may be alternately substituted for the arrangement shown. A row of suitable gas distributor members 25 are provided across the vessel shortly above the bottom section 12. These members may comprise inverted angles or channels open on their bottoms and spaced horizontally apart across the vessel. Gas inlet pipes 26 are provided for each distributor member, and these pipes connect into a manifold 27 to which gas may be introduced through an inlet pipe 28. A flow control valve 29 and flow indicator 30 are provided on the inlet pipe 28. A similar row of distributor members 31 is provided across the vessel at a fixed vertical interval above the members 25. These members are provided with inlet pipes 32 which connect into manifold 33 to which is connected inlet pipe 34 connecting the manifold 33 with the discharge from a line type gas heater 35. A valve 36 is provided on the pipe 34. The heater is provided at its opposite end with a fuel inlet 37 having valve 38 thereon and a gas inlet 39 having a valve 40 and flow indicator 41 thereon. It will be understood that the structure of the gas distributing members, the external gas manifolding and the means for heating gas are intended as exemplary and certain equivalent constructions which will readily suggest themselves to those skilled in the art are also intended to be included within the scope of this invention. The exact construction of the heater 35 will depend upon the particular process involved. For example, if the process involved is the cracking of gas oil or other hydrocarbons to ethylene, the heater 35 may take the form of a conventional flue gas generator wherein a gaseous fuel may be introduced at 37 and air at 39 in such controlled proportions as to give a hot flue gas product containing substantially no oxygen at 34. Steam may be added in controlled amounts at 42 as an aid to the reaction conducted in zone B. On the other hand additional fuel gas or recycle gas may be introduced instead of steam through conduit 42. In other processes, some other suitable gas may be introduced at 42 or no gas at all. In such processes as the manufacture of butadiene and thiophene by the reaction of n-butane and sulphur vapor, the heater 35 may take a form conventional in the art for the vaporization and heating of sulphur so that the sulphur vapor itself may be used either alone or in conjunction with an inert gas introduced at 42 to supply the heat required to maintain the desired reaction temperature in zone B. Below the vessel 10 is provided a regeneration vessel 50 wherein the solid material discharging from vessel 10 may be regenerated. In some processes, for example, the high temperature catalytic conversion of gas oil to aviation gasoline, a carbonaceous contaminant may be deposited upon the solid particles. This contaminant may be burned from the catalyst in regenerator 50 by means of air introduced through inlet 51. Gaseous regeneration products may be removed through outlet 52. A heat exchange fluid introduced at 53 and withdrawn at 54 may be passed through suitable heat transfer tubes (not shown) within the regenerator to remove heat liberated during the catalyst regeneration. It will be apparent that the term "regenerator" and the term "regeneration zone" as used herein in describing and in claiming this invention are used in a broad sense as meaning a zone wherein a contaminant material deposited on the solid material in the reaction zone may be removed regardless of whether the solid material acts as an inert or as a catalyst to the reaction involved in said reaction zone. A cooler 55, having cooling fluid inlet 56 and cooling fluid outlet 57 or the reverse, is connected to the lower end of regenerator 50 by conduit 58 bearing valve 59. The cooling within cooler 55 may be done either by direct or indirect heat transfer between the solid particles and a suitable cooling fluid. An outlet 60 is provided for withdrawal of solid material from cooler 55 to a suitable conveyor 61. The conveyor 61 may be a number of conventional types adapted to convey hot solid particles. The conveyor discharges through duct 62 into inlet 13 of vessel 10. In those operations wherein regeneration of the solid material is unnecessary the regenerator may be eliminated, in which case solid material passes from vessel 10 through conduits 14 and 63 directly into conveyor 61. In those operations wherein regeneration of the solid material is unnecessary but adjustment of its temperature before its return to the top of vessel 10 is desirable, the solid may pass from vessel 10 through conduits 14 and 64 to vessel 60 wherein the solid is cooled or heated as required.

While the method of this invention has thus far been discussed in connection with its application to endothermic reaction processes, it may also be applied to exothermic reaction process. In the latter case, the gas introduced through conduit 34 may be at a temperature below the reaction temperature in zone B. Moreover, if the treatment in vessel 50 results in a substantial lowering of the solid temperature, vessel 55 may be operated as a heater instead of a cooler.

As a typical example of the operation according to the method of this invention, the process of ethylene manufacture by the high temperature cracking of ethane may be considered. In this operation a particle-form solid refractory material, such as fused alumina, mullite or zirkite, for examples, which material is substantially inert to the reactants may be employed. Generally, the particle size range should fall within the range 0.006 to 1.0 inch and preferably within the range 0.2 to 0.5 inch mesh by Tyler standard screen analysis. The solid material is introduced into the upper end of vessel 10 at a temperature of the order of 950–1000° F., for example. As the solid material passes slowly downwardly through that uppermost portion of the vessel represented as zone A, it will be gradually heated to a suitable temperature for ethane cracking, for example, to about 1450–1500° F. by the upwardly flowing gas. It will be maintained within the reaction temperature range of approximately 1450° F. to 1800° F. during its passage through zone B. During its passage through zone C between the two rows of distributor members 31 and 25, the solid will be cooled to about 950–1000° F. by the gaseous charge introduced through the distributors 25 and passing upwardly therefrom. The solid material is drained from the bottom of vessel 10 through conduit 14 at a rate controlled by valve 15 and is passed through conduit 63 into conveyor 61 by which it is conveyed back to duct 62 feeding inlet conduit 13 at the top of vessel 10. The inlet conduit 13 should be of sufficient vertical length to insure feed of the contact material into vessel 10 against the gaseous pressure therein. A surge hopper (not shown) may be provided between the duct 62 and conduit 13. Reactant ethane gas at about 80° F. may be introduced through conduit 28, manifold 27 and pipes 26 under the row of distributors 25. In some cases the inlet ethane may be preheated somewhat. The gas inlet temperature should be so controlled as to permit its heating in zone C to at least about the lower limit of the desired reaction temperature range i. e., about 1450° F. by contact with the solid material in zone C. The cracking reaction occurs for the most part in zone B at a pressure generally of the order of 0 to 15 pounds gauge. The reaction products containing a high percentage of ethylene are quickly quenched to about 950–1000° F. by direct contact with the cooler incoming solid material within zone A. The quenched gaseous reaction products are then withdrawn through conduit 21 and are passed to a suitable product fractionation system (not shown) which may be of conventional type. Usually, there is very little contaminant deposited upon the inert solid particles in this process so that its removal by burning is unnecessary. In some operations for ethylene manufacture, for example by the cracking of gas oils, there may be an appreciable amount of carbonaceous contaminant deposited on the circulating inert material. This may be removed by passage of all or of a portion of the solid stream from conduit 14 through conduit 65 into regenerator 50 and then through cooler 55 wherein its temperature is adjusted to a level suitable for introduction into vessel 10. The cracking of ethane is a strongly endothermic reaction. The heat required for this reaction and that required to compensate for radiant and convective heat losses may be supplied to the reaction zone B by means of the burner 35. A suitable refinery fuel gas may be introduced to the burner through pipe 37 and air through pipe 37. Steam may be introduced as a heat carrying fluid through pipe 42. The amount of air, flue gas and steam may be so regulated as to provide substantially complete utilization of the oxygen in the air and as to provide a sufficient quantity of mixed steam and flue gas at a high temperature in pipe 34 to supply the heat required for reaction in zone B. In a typical operation ethane at about 80° F. may be introduced into pipe 26 at a rate of about 180,000 standard cubic feet per hour. A mixture consisting of about 40–60% by weight flue gas and the remainder steam may be introduced at a rate of about 60,000–70,000 pounds per hour at a temperature of about 1800° F. through pipe 32 under the distributors 31. The resulting gaseous and solid temperature near the bottom of zone B in this example is of the order of 1800° F. The gaseous materials are cooled somewhat during the endothermic reaction in zone B and leave the upper end of zone B at about 1500° F. The rate of solid flow through vessel 10 should be such as will insure transmission of the required amount heat recovered from the gas in zone A, back to the incoming gas in zone B. In the above example, a solid throughput rate amounting to about 30 to 35 tons per hour is satisfactory. The volume of zone B should be such as to provide a reactant residence time of about 1.0–1.7 seconds. The escape of reactants from the lower and upper ends of the vessel may be prevented by introduction of an inert gas such as steam or flue gas through conduits 66 and 67 so as to maintain a blanket of inert gas in the upper and lower ends of the vessel 10. In an operation of the above type for converting a petroleum gas oil to ethylene containing products suitable temperature conditions are as follows: reaction temperature within the range about 1450° to 1700° F., reaction products quenched to about 850°–1000° F. in the quench zone, solids supplied to quench zone and withdrawn from bottom zone at about 800°–1000° F. and gas oil supply temperature below that which would cause substantial cracking.

The application of the method of this invention to the process for production of thiophene and butadiene by reaction of n-butane and sulphur at temperatures within the range 850–1400° F. may be briefly considered. In this process, the sulphur vapor itself may be introduced under distributors 31 as the heat supply source and butane may be introduced under the distributors 25. For this reaction the solid may enter the top of vessel 10 at about 850° F. and be withdrawn from the lower end of vessel 10 at about the same temperature. N-butane preheated to about 500-800° F. may be introduced through conduit 28. The exact inlet temperature of the N.-C$_4$ charge may be regulated to permit its preheating in zone B to the lower limit of the reaction temperature range i. e., about 850° F. The ratio of sulphur to n-butane charge on a weight basis may be of the order of about ½-4 parts of sulphur per part of n-butane and the temperature of the incoming sulphur vapors will vary depending upon this ratio and upon the reaction temperature. The reaction temperature in zone B should be preferably within the range about 900-1300° F. As an example, when the reaction temperature in zone B is on the average about 1000° F. and the sulphur to n-butane ratio is of the order of one to one parts by weight, the temperature of the incoming sulphur vapor should be of the order of about 1430° F. The resulting mixed gas temperature in this operation near the bottom of zone B will be about 1050-1100° F. The gas will leave the upper end of zone B at about 950° F. The solid will leave the bottom of zone B at about 1000-1050° F. The reaction products are quickly quenched from 950° F. to about 850° F. in zone A and are then withdrawn in the gaseous phase through outlet 21 to a quenching tower wherein they may be further quenched to any suitable temperature. Excess sulphur may be recovered from the reaction by-products and again used. In this operation the rate of solid flow should be sufficient to permit continuous and adequate quenching of the reactant throughput. The rate of solid throughput will depend, of course, on the heat capacity of the particular solid material used. For the above operation, an inert refractory such as fused alumina may be used. The rate of sulphur and n-butane introduction should be such as to give a reaction time in zone B amounting to about 0.5 to 2.0 seconds. The pressure in zone B may be only slightly over-atmospheric. In the above operation, some carbonaceous contaminant may be deposited on the inert solid particles. This contaminant may be removed by burning in regenerator 50.

It will be apparent from the above discussion that the method of this invention permits the conducting of gaseous reactions in the presence of a moving particle-form solid material at very high reaction temperatures without the necessity of subjecting the solid conveying equipment to the high reaction temperatures. Inasmuch as it is usually undesirable to convey solid materials of this type in mechanical conveyors, bucket elevators, for example at temperatures in excess of about 1100° F., this feature alone permits the commercial conducting of a large number of reactions in a continuous moving column type operation, which reactions heretofore could not be so conducted. Moreover, by the method of this invention, hot reactants issuing from the reaction zone are immediately quenched by direct contact with cooler solid particles. The very high rate of heat transfer which is characteristic of such direct gas-solid heat transfer permits very rapid quenching of the reaction products so as to prevent decomposition thereof. It will be noted that the quenching is accomplished without the necessity for passing the hot reactants through transfer conduits leading to a quenching zone. Thus, the coking difficulties near the outlet from the reaction zone and in the outlet conduit from the reactor, which were formerly encountered have been eliminated. Moreover, since the heat recovered by quenching reaction products in zone A is later utilized in heating the reactant charge in zone C, a substantial overall savings in heat is accomplished by the method of this invention.

It will be apparent that the method of this invention while permitting close and accurate control of the solid material temperature during the gaseous reaction in the reaction zone, also permits considerable simplification in apparatus construction and auxiliary apparatus requirements with resultant decrease in cost thereof and also a decrease in the amount of heat which must be supplied from external sources and in the amount of heat that must be removed from the system by external mediums with resultant marked reduction in operation costs as compared with methods formerly used for conducting such processes as have been described hereinabove.

It will be understood that the dimensions of the apparatus employed, the rates of reactant and solid flow, and the type of solid material and heat exchange gas employed are subject to wide variation depending upon the particular process to which this invention is applied. In general, the reaction zone should be of such size as will permit the proper time of reactant contact with the suitable solid material therein for any given process. The quenching zone should be of sufficient size to permit the proper amount of reaction product quenching in the required time and may be calculated for any given set of conditions by use of data on direct heat transfer between solids and gases which is available in the literature. The size of the gas preheating zone should be such as to provide proper preheating of reactant charge and cooling of the solid material and may be calculated by methods similar to those used for the quenching zone for any given set of conditions.

The type of solid material used may vary from an inert solid such as corhart material, a fused alumina, which may be used for ethylene manufacture to an adsorbent type catalytic material which may be used for catalytic dehydrogenation reactions and for catalytic cracking reaction. Such catalytic materials may take the form of natural or treated clays, bauxites, inert carriers containing deposited metallic oxides such as deposits of the oxides of molybdenum, chromium or tungsten, or certain synthetic associations of silica, alumina or silica or alumina to which small percentages of other materials such as a metallic oxides may be added for special purposes. In general, it has been found that the particle size of such contact materials should fall broadly within the range about 2 to 100 mesh and preferably within the range about 2½ to 8 mesh by Tyler standard screen analysis. It should be understood that the expression "suitable particle form solid material" as used in describing and in claiming this invention is used in a sense sufficiently broad to cover either so-called catalytic or non-catalytic materials which may be found suitable for the particular reaction involved. The term is to be considered as limited, however, only to those solid materials which have physical and chemical characteristics making them suitable for the particular process involved. Thus, for example solids, which would permanently enter substantially into the reaction or which would be decomposed or otherwise damaged under the reaction conditions involved, are not intended to be included in the term.

The type of heat exchange gas which may be introduced under distributors 31 will also vary depending upon the particular process involved. In one reaction, for example the reaction of n-butane and sulphur described hereinabove, the heat exchange gas may either partially or entirely take part in the reaction. In other processes, for example the cracking of ethane, the heat exchange gas may be substantially inert under the conditions of the reaction. In every case, however, the gas has one common characteristic, namely, that it is adapted to carry heat and to give it up to the solid material or to the reactants in the reaction zone. The expression "suitable heat exchange gas" as used in describing and in claiming this invention is intended to mean a gas capable of carrying heat into the reaction zone and giving it up to the solid material and reactants therein by direct heat transfer therein and which is suitable chemically and physically for the particular process involved. Thus, a gas used for any particular reaction process which would undergo an undesirable reaction under the conditions in the reaction zone or which would injure the solid material or reaction vessel is not intended to be included within the meaning of the above expression.

In the claiming of this invention the expressions "suitable reaction temperature" and "range of suitable reaction temperatures" are intended to mean a temperature or range of temperatures which are suitable for conducting the particular reaction involved at a practical rate and to practical yields of the desired products.

It should be understood that the foregoing description of the method of this invention and examples of its applications and of the apparatus to which it may be applied are merely exemplary in character and are not intended to limit the scope of this invention except as it is limited in the following claims.

We claim:

1. A method for conducting endothermic reactions involving gaseous reactants in the presence of a suitable particle-form solid material which comprises: maintaining a substantially compact, elongated, confined column of said suitable particle-form solid material, supplying solid material to the upper end of said column at a temperature substantially below the suitable reaction temperature range for said gaseous reactants, maintaining said solid material within said reaction temperature range during its flow along an intermediate portion of the column length, withdrawing solid material from the lower end of said column at a temperature substantially below the suitable reaction temperature range existing along said intermediate portion of said column, recycling said withdrawn solid to the upper end of said column as said supply, introducing gaseous reactant into the lower section of said column at a temperature substantially below the suitable reaction temperature range existing along the intermediate portion of said column and passing said gaseous reactant upwardly through said column to effect cooling of said solid material in the lower portion of said column from the reaction temperature range existing along said intermediate portion of said column to a temperature substantially therebelow, and to effect heating of the cooler incoming solid in the upper portion of said column to said reaction temperature range before said solid material enters said intermediate portion of said column while the gaseous reaction products formed in the intermediate portion of the column are quenched in said upper portion by direct contact with said solid to a temperature substantially below the suitable reaction temperature range existing in said intermediate portion of said column, withdrawing the quenched gaseous products from the upper portion of said column, and at the same time balancing any net heat loss from said intermediate portion of said column by introducing into said column substantially at that level therein wherein the cooling effect of said reactant gas on the solid becomes negligible, a controlled amount of a suitable heat exchange gas at a temperature substantially above the reaction temperature existing in said intermediate portion of said column.

2. The method of accomplishing endothermic conversions of gaseous reactants at a suitable elevated reaction temperature in the presence of a suitable moving particle-form solid material which comprises: continuously passing said suitable particle-form solid material cyclically through three superposed, communicating zones wherein said solid flows as a substantially compact column, the solid material in the intermediate zone being maintained at the desired reaction temperature level introducing gaseous reactants into the lowermost of said zones at a temperature substantially below the temperature level in said intermediate zone and passing said gaseous reactants through said lowermost zone countercurrent to the solid flow to cool said solid to a level substantially below said suitable reaction temperature level existing in said intermediate zone and to heat said reactants to said suitable reaction temperature, passing said reactants through the intermediate zone, countercurrent to the solid flow to effect the conversion of said reactants to gaseous reaction products, passing said reaction products through said uppermost zone to countercurrently contact the cooler solid particles so as to quickly quench said reaction products to a level substantially below the suitable reaction temperature level existing in said intermediate zone while said solid particles are heated substantially to said reaction temperature from an inlet temperature substantially therebelow, withdrawing quenched gaseous reaction products from said uppermost zone, and at the same time supplying the heat required for reaction in said intermediate zone by introducing thereinto along with said gaseous reactants from said lowermost zone a controlled amount of a suitable heat exchange gas heated to a temperature substantially above the temperature level in said intermediate zone.

3. A method for conducting reactions involving gaseous reactants in the presence of a moving stream of a suitable particle form solid material at a suitable reaction temperature range which is substantially above the temperature level at which it is practical to convey said solid particles which method comprises: introducing said solid material to the upper end of an elongated confined zone at a suitable conveying temperature which is substantially below said suitable reaction temperature range, flowing the solid material downwardly through said zone and maintaining it within said suitable reaction temperature range in an intermediate section along the length of said zone and withdrawing solid material from the lower end of said zone at a suitable conveying temperature which is substantially below the reaction temperature, introducing reactant gas into the lower section of said zone at a temperature substantially below said suitable reaction temperature range existing in said intermediate section of said zone, passing said gas through said zone countercurrently to the flow of said solid material and withdrawing gaseous reactants from the upper section of said zone so as to cool said solid in the lower section of said zone to said suitable conveying temperature, and so as to heat the incoming solid in the upper section of said zone to a temperature within said suitable reaction temperature range; and at the same time introducing a suitable heat exchange gas into said zone approximately at that level where the cooling effect of the gaseous reactant charge on said solid material has become substantially negligible, said heat exchange gas being introduced at a temperature substantially outside of said suitable reaction temperature range existing in said intermediate section of said zone and at least at a sufficient rate to balance the heat of said reaction.

4. The method for conducting thermo-chemical gaseous reactions in the presence of a suitable moving particle-form solid material at temperatures within a suitable elevated reaction temperature range at which the resulting gaseous reaction products rapidly undergo further reaction unless quickly quenched which method comprises: maintaining a downwardly moving compact column of said solid material particles in a confined reaction zone within a suitable temperature range for conducting said gaseous reactions, passing at least one of the gaseous reactants existing initially at a temperature substantially below that in said conversion zone through a preliminary preheating zone in which it flows countercurrently to a substantially compact column of said particles supplied by flow from said reaction zone to effect cooling of said particles from said reaction temperature range to an outlet temperature substantially therebelow while said reactant is heated to said reaction temperature range, passing said preheated gaseous reactants through the reaction zone countercurrently to the solid material flow therein to effect the thermochemical reaction, introducing a suitable heat exchange gas into said reaction zone along with said reactant from said preheating zone, said heat exchange gas being introduced at a temperature outside of said suitable reaction temperature range and at a controlled rate at least sufficient to balance the heat of said thermochemical reaction in said reaction zone, passing gaseous materials from said reaction zone through a communicating quenching zone countercurrently to the flow of a substantially compact column of said solid material flowing to said reaction zone to effect quenching of said gaseous reactants and simultaneously the preheating of said solid material towards said reaction temperature range, withdrawing quenched gaseous reactants from said quenching zone, withdrawing cooled solid material from said preheating zone and supplying solid material to said quenching zone at a temperature substantially below said reaction temperature range existing in said reaction zone.

5. A method for conducting thermochemical reactions involving gasiform reactants in the presence of a suitable particle form solid material which comprises: introducing said solid material to the upper end of an elongated confined zone at a temperature substantially below the suitable reaction temperature range for said gaseous reactants, flowing said solid material downwardly through said zone as a substantially compact column and maintaining it within said suitable reaction temperature range along an intermediate section of the column length, withdrawing solid material from the lower end of said zone at a throttled rate and at a temperature substantially below the reaction temperature range existing along said intermediate section of said column, adjusting the temperature of the withdrawn solid material and returning it to the upper end of said zone as the solid material supply, introducing gasiform reactant into the column in the lower section of said zone at a temperature substantially below said reaction temperature range existing along said intermediate section of said column, passing said reactant upwardly through a lower section of said column to become preheated to said reaction temperature range while cooling the solid material to a temperature substantially below the reaction temperature range, continuing the upward passage of the reactant through said intermediate portion of said column to effect the thermochemical reaction and passing the gasiform reaction products on upwardly through the upper portion of said column to effect a quenching of said reaction products by direct contact with the cooler solid material to a temperature substantially below said reaction temperature range while preheating the entering solid material towards said reaction temperature range; and at the same time substantially maintaining an overall heat balance over said column in said confined zone by introduction into said column at a level substantially between said lower section and intermediate section thereof of a controlled stream of suitable heat exchange gas at a temperature outside of said suitable reaction temperature range.

6. The method of conducting high temperature endothermic reactions involving gaseous hydrocarbons in the presence of a suitable moving particle-form solid material at a suitable range of reaction temperatures which method comprises: maintaining a downwardly moving compact column of said solid material particles in a confined reaction zone within a suitable temperature range for conducting the endothermic reaction, passing a gaseous hydrocarbon reactant feed through a preliminary preheating zone in which it flows countercurrently to a substantially compact column of said solid particles flowing from a said confined reaction zone so as to cool said solid particles to a temperature substantially below the range of suitable reaction temperatures while said reactant is heated to said reaction temperature range from an inlet temperature substantially therebelow, passing said preheated gaseous reactant through said reaction zone countercurrently to the flow of a substantially compact column of said contact material therein to effect the endothermic reaction, introducing a suitable heat exchange gas into said reaction zone along with said reactant from said preheating zone, said heat exchange gas being introduced at a temperature substantially above said range of suitable reaction temperatures and at a controlled rate at least sufficient to balance the heat of said endothermic reaction in said reaction zone, passing gaseous materials from said reaction zone through a communicating quenching zone countercurrently to the flow of a substantially compact column of said solid material flowing to said reaction zone to effect quenching of said gaseous materials to a temperature substantially below that existing in said reaction zone while also effecting the heating of the solid material to said reaction temperature range from an inlet temperature which is substantially therebelow, withdrawing quenched gaseous materials from said quenching zone, withdrawing the cooled solid material from said preheating zone and passing it through a regeneration zone while contacting it therein with a combustion supporting gas to burn off a carbonaceous contaminant deposited on said solid material in said reaction zone, adjusting the temperature of the solid material from said regeneration zone to a level substantially below the range of reaction temperatures existing in said reaction zone and conducting said solid material to the upper end of said quenching zone as the supply thereto.

7. The method for conversion of saturated hydrocarbons to ethylene which comprises: passing a suitable particle-form refractory-type solid material cyclically through three superposed communicating zones as a substantially compact column at a controlled rate, into the first of which zones said solid enters at a temperature substantially below the suitable range of reaction temperatures for said saturated hydrocarbons, in the second of which it is maintained within said suitable range of reaction temperatures and from the third of which it issues at a temperature substantially below the suitable range of reaction temperatures, introducing gaseous saturated hydrocarbon feed into the third of said zones at a temperature substantially below the suitable range of reaction temperatures, passing said feed upwardly through the column in said third zone to effect preheating of said feed substantially to said reaction temperature range and to effect cooling of the solid material to a temperature substantially therebelow, passing said gaseous feed from said third zone through said second zone countercurrently to the solid flow to effect conversion of said feed to a gaseous ethylene containing product, maintaining the temperature in said second zone within said suitable range of reaction temperatures by introduction thereinto along with said gaseous feed a controlled quantity of a suitable inert heat exchange gas at a temperature substantially above said suitable range of reaction temperatures, passing the combined gaseous material from said second zone countercurrently to said solid flowing through said first zone so as to cool said gaseous material by direct contact with said solid to a temperature sufficiently low to prevent substantial decomposition of the ethylene product while said solid material is thereby preheated towards said reaction temperature range and withdrawing gaseous material from said first zone.

8. The method for conversion of petroleum gas oils to ethylene which comprises: supplying a particle form solid inert refractory material into the upper end of a confined elongated compact column thereof at a temperature within the range about 800–1000° F., flowing the solid material downwardly in said column and maintaining it within the range about 1450–1700° F. along an intermediate section of the column length, withdrawing solid material from the lower end of said column at a temperature within the range about 800–1000° F., introducing gas oil feed in the gaseous phase but below a temperature at which substantial cracking occurs into the lower section of said column and passing it upwardly to effect the cooling of said solid as aforesaid and to effect the preheating of said feed to a temperature within the range about 1450–1700° F., passing the preheated feed upwardly through said intermediate section of said column to effect its conversion in contact with said solid material at temperatures within the range 1450° F.–1700° F. while introducing a suitable inert heat exchange gas into said column approximately between said lower and intermediate sections at a temperature above the range 1450° F.–1700° F. and at a rate sufficient to maintain the temperature in said intermediate section, passing the gaseous material from said intermediate section through the upper section of said column countercurrent to the solid movement so as to cool said gaseous material to a temperature within the range about 850° F.–1000° F. while said solid material is heated towards the reaction temperature range, withdrawing cooled gaseous material from the upper section of said column, passing at least a portion of the solid material withdrawn from the lower section of said column through a confined zone wherein carbonaceous deposits contained thereon are removed by burning, adjusting the temperature of said solid material from said burning zone to a temperature within the range about 800° F.–1000° F. and conducting said solid material to the upper end of said column as the supply thereto.

9. The method for conversion of normal butane to butadiene and thiophene containing products which comprises: passing a suitable particle-form refractory-type solid material cyclically through three superposed communicating zones as a substantially compact column at a controlled rate, into the first of which zones said solid enters at a temperature substantially below the suitable range of reaction temperatures for said saturated hydrocarbons, in the second of which it is maintained within said suitable range of reaction temperatures and from the third of which it issues at a temperature substantially below the suitable range of reaction temperatures, introducing normal butane feed into the third of said zones at a temperature substantially below the suitable range of reaction temperatures, passing said feed upwardly through the column in said third zone to effect preheating of said feed substantially to said reaction temperature range while said solid material is cooled to a temperature substantially therebelow, passing said gaseous feed from said third zone through said second zone countercurrently to the solid flow and also introducing heated sulphur vapor into said second zone to effect the production in said second zone of a gaseous product containing thiophene and butadiene, said sulphur vapor being introduced into said second zone at a temperature substantially above said suitable range of reaction temperatures and being introduced at such a rate as to maintain substantially constant the suitable range of reaction temperatures in said second zone, passing the combined gaseous material from said second zone countercurrently to said solid flowing through said first zone so as to cool said gaseous material by direct contact with said solid to a temperature substantially below said suitable range of reaction temperatures, while said solid material is thereby preheated towards said reaction temperature range existing in said second zone and withdrawing gaseous material from said first zone.

10. The method for production of thiophene and butadiene containing products from normal butane and sulphur which comprises: maintaining a substantially compact elongated confined column of a particle-form solid inert refractory material, supplying solid material to the upper end of said column at a temperature within the range about 850–900° F., withdrawing solid material from the lower end of said column at a temperature within the range about 850–900° F. and returning said withdrawn solid material to the upper end of said column as the supply, introducing normal butane feed at a temperature substantially below about 900° F. into the lower section of said column to cool said solid and to be heated by said solid to a temperature within the range about 900–1300° F., passing said gaseous reactant upwardly through said column and adding to it at approximately that level therein where it first reaches a temperature within the range 900–1300° F. a stream of heated sulphur vapor so that said normal butane and sulphur vapor undergo reaction in the intermediate section of said column, said sulphur vapor being introduced at a sufficient temperature and in sufficient amount to supply the heat required for said reaction, passing the gaseous products from said intermediate section through the upper section of said column countercurrent to the solid movement so as to cool said gaseous products to a temperature within the range about 850° F.–900° F. while said solid material is heated to a level within the reaction temperature range 900° F.–1300° F. withdrawing the cooled gaseous products and further cooling them quickly in a separate zone.

ERNEST UTTERBACK.
ERIC V. BERGSTROM.

REFERENCES CITED

The following references are of record in the file of this patent:

UNITED STATES PATENTS

| Number | Name | Date |
|---|---|---|
| 2,111,899 | Nagel | Mar. 22, 1938 |
| 2,185,566 | Porter | Jan. 2, 1940 |
| 2,274,003 | Sheppard | Feb. 24, 1942 |
| 2,315,506 | Danner | Apr. 6, 1943 |
| 2,364,453 | Layng et al. | Dec. 5, 1944 |
| 2,387,378 | Wolk | Oct. 23, 1945 |
| 2,389,636 | Ramseyer | Nov. 17, 1945 |
| 2,407,700 | Huff | Sept. 17, 1946 |
| 2,408,600 | Berg | Oct. 1, 1946 |